United States Patent
Ito (10) Patent No.: US 8,279,724 B2
(45) Date of Patent: Oct. 2, 2012

(54) OPTICAL PICKUP

(75) Inventor: Tatsuya Ito, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 459 days.

(21) Appl. No.: 12/685,907

(22) Filed: Jan. 12, 2010

(65) Prior Publication Data

US 2010/0177623 A1   Jul. 15, 2010

(30) Foreign Application Priority Data

Jan. 13, 2009   (JP) .................... 2009-004770

(51) Int. Cl.
*G11B 7/00*   (2006.01)

(52) U.S. Cl. ........... 369/44.14; 369/112.23; 369/112.21; 369/44.37

(58) Field of Classification Search .......... None
See application file for complete search history.

(56) References Cited

U.S. PATENT DOCUMENTS

| | | | |
|---|---|---|---|
| 2006/0225087 A1 | 10/2006 | Shimokawa et al. | 720/683 |
| 2007/0147198 A1 | 6/2007 | Nagatomi et al. | 369/44.23 |
| 2008/0031099 A1* | 2/2008 | Tezuka | 369/44.14 |
| 2008/0055734 A1 | 3/2008 | Arai | 359/638 |
| 2008/0056101 A1 | 3/2008 | Hatano | |
| 2008/0175129 A1* | 7/2008 | Tanaka et al. | 369/112.23 |

FOREIGN PATENT DOCUMENTS

| | | |
|---|---|---|
| EP | 1 615 212 A2 | 11/2006 |
| JP | 2001-101692 | 4/2001 |
| JP | 2007-334990 A | 12/2007 |
| JP | 2008-059659 A | 3/2008 |

* cited by examiner

*Primary Examiner* — Muhammad N Edun (74) *Attorney, Agent, or Firm* — Morgan, Lewis & Bockius LLP (57) ABSTRACT

An optical pickup has a first optical system and a second optical system. The optical axis of the first optical system and the optical axis of the second optical system are inclined, for example, 45 degrees with respect to the reference plane, and are parallel to each other. A first objective lens and a second objective lens are arranged substantially side-by-side in a radial direction, and the center position of the second objective lens is slightly displaced from the reference plane in a tangential direction. The first optical system and the second optical system each have a flat-shaped beam splitter; this is used to produce astigmatism for acquiring a focus error signal by the astigmatic method.

10 Claims, 4 Drawing Sheets

OPTICAL PICKUP

This application is based on Japanese Patent Application No. 2009-4770 filed on Jan. 13, 2009, the contents of which are hereby incorporated by reference.

BACKGROUND OF THE INVENTION

1. Field of the Invention

The present invention relates to an optical pickup, and more particularly to the configuration of an optical pickup having two separate optical systems that are selectively used according to the type of optical disc.

2. Description of Related Art

Conventionally, optical pickups are used to read information on an optical disc and write information on the optical disc. There are a plurality of types of optical discs such as a compact disc (CD), a digital versatile disc (DVD) and a blue-ray disc (BD). Thus, for convenience and the like, among conventional optical pickups, there are some optical pickups that can be compatible with a plurality of types of optical discs.

Among the optical pickups compatible with a plurality of types of optical discs, there are some optical pickups which have two separate optical systems that are selectively used according to the type of optical disc (for example, see patent documents 1 and 2). Here, the optical systems each function to guide light emitted from a light source to the information storage surface of the optical disc and to guide the light reflected off the information storage surface to a light receiving element. As a specific example of these optical pickups, there is an optical pickup in which one of the optical systems is used such as for reading information on a BD and in which the other optical system is used such as for reading information on a DVD or a CD.

Incidentally, in an optical pickup, an objective lens for condensing light emitted from a light source on the information storage surface of an optical disc is mounted on an objective lens actuator. This objective lens actuator can move the objective lens mounted at least in a focus direction and in a track direction. Here, the term "focus direction" refers to a direction that is perpendicular to the information storage surface of the optical disc; the term "track direction" refers to a direction that is parallel to a radial direction of the optical disc. The purpose of moving the objective lens in the focus direction is to control (perform focus control) the focal position of the objective lens such that the focal position is constantly located on the information storage surface. The purpose of moving the objective lens in the track direction is to control (perform track control) a light spot obtained by condensing light through the objective lens such that the light spot constantly follows the track of the optical disc.

Among the optical pickups having two separate optical systems, there are some optical pickups in which, as disclosed in, for example, patent documents 1 and 2, objective lenses included in the optical systems are mounted in one lens holder and in which one objective lens actuator allows the two objective lenses to move. With this configuration, for example, the size of a device and the number of components are advantageously reduced.

When two objective lenses are mounted in a lens holder, they are preferably mounted such that the space between the two objective lenses is minimized. This is because, for example, in an objective lens actuator that supports a lens holder with a wire, if the space between two objective lenses mounted in the lens holder is large, the drive sensitivity and the DC tilt of the objective lens actuator may be degraded, and this degradation is needed to be reduced.

When the space between two objective lenses is reduced, it is necessary to arrange upward reflecting mirrors included in two separate optical systems as close to each other as possible. The term "upward reflecting mirror" as used here refers to a mirror which reflects light such that the optical axis of light emitted from a light source is perpendicular to the information storage surface of an optical disc. Conventionally, one way to arrange the upward reflecting mirrors close to each other is to cut parts of the upward reflecting mirrors.

However, when the upward reflecting mirrors are cut, a cutting process is required, and thus the cost of the upward reflecting mirrors is increased. To overcome this problem, in patent document 1, there is provided a technology with which to reduce not only the cost of the mirrors but also the distance between the mirrors and which thus allows the distance between the objective lenses to be decreased.

To be sure, with the configuration of patent document 1, it is possible not only to reduce the cost of the mirrors but also to reduce the distance between the objective lenses with advantage. However, in view of the recent requirement to reduce the cost of an optical pickup, it is insufficient to reduce the cost of the mirrors, and it is necessary to achieve further cost reduction.

Patent document 1: JP-A-2007-334990
Patent document 2: JP-A-2008-59659

SUMMARY OF THE INVENTION

To overcome the foregoing problem, the present invention has an object to provide an optical pickup that has two separate optical systems, that includes a small number of components and that can be manufactured at a low cost.

To achieve the above object, according to one aspect of the present invention, there is provided an optical pickup including: a first optical system that guides first emission light emitted from a first light source to an information storage surface of an optical disc and that guides, to a first light receiving element, first return light resulting from the first emission light being reflected off the information storage surface; and a second optical system that guides second emission light emitted from a second light source to the information storage surface of the optical disc and that guides, to a second light receiving element, second return light resulting from the second emission light being reflected off the information storage surface. The first optical system includes: a first mirror that reflects the first emission light to direct an optical axis in a direction substantially perpendicular to the information storage surface; a first objective lens that condenses light reflected off the first mirror on the information storage surface; and a flat-shaped first beam splitter that is arranged in an optical path between the first mirror and the first light receiving element, that reflects the first emission light emitted from the first light source and guides the reflected first emission light to a side of the first mirror and that transmits the first return light resulting from reflection off the first mirror and guides the transmitted first return light to a side of the first light receiving element. The second optical system includes: a second mirror that reflects the second emission light to direct an optical axis in a direction substantially perpendicular to the information storage surface; a second objective lens that condenses light reflected off the second mirror on the information storage surface; and a flat-shaped second beam splitter that is arranged in an optical path between the second mirror and the second light receiving element, that reflects the second emission light emitted from the second light source and guides the reflected second emission light to a side of the second mirror and that transmits the second return light resulting from reflection off the second mirror and guides the transmitted second return light to a side of the second light receiving element. The first light source, the first mirror, the first beam splitter, the first light receiving element, the second light source, the second mirror, the second beam splitter and the second light receiving element are fixed and arranged on a same base, a first optical axis that is the optical axis of an optical path between the first mirror and the first beam splitter is substantially parallel to a second optical axis that is the optical axis of an optical path between the second mirror and the second beam splitter, and when a plane that is parallel to a movement direction where the optical pickup is moved with respect to the optical disc at a time of use of the optical pickup, that is perpendicular to the base and that passes through a center of the first objective lens is a reference plane, the first optical axis and the second optical axis are inclined more than zero degrees but less than ninety degrees with respect to the reference plane when the base is seen from above, the first objective lens and the second objective lens are arranged substantially side-by-side in the movement direction, and a center position of the second objective lens is slightly displaced from the reference plane in a direction substantially perpendicular to the reference plane.

According to the above configuration, in the first optical system and the second optical system, the light transmitted through the flat-shaped beam splitter is guided to the light receiving element. In this case, with the flat-shaped beam splitter, it is possible to obtain astigmatism used for acquiring the focus error signal by the astigmatic method. Thus, with this configuration, it is possible to omit a conventionally arranged cylindrical lens (sensor lens) for producing astigmatism to reduce the number of components. In the configuration where the cylindrical lens can be omitted, the relationship between the optical axis of the first optical system and the optical axis of the second optical system and the positional relationship between the two objective lenses are well designed. Thus, even when the two objective lenses are brought close to each other, it is possible to avoid the mechanical interference between the first and second mirrors that can be manufactured at low cost. In other words, with this configuration, even when the two objective lenses are brought closer to each other, it is possible to manufacture the optical pickup at a low cost.

In the optical pickup configured as described above, the first light receiving element and the second light receiving element each may have four light receiving regions arranged two-by-two, and the first optical axis and the second optical axis may be inclined around forty five degrees with respect to the reference plane. Here, the "around 45 degrees" refers to a range from 30 degrees to 60 degrees. With this configuration, it is likely to obtain a satisfactory focus error signal.

The optical pickup configured as described above may further include: an objective lens actuator including: a lens holder that holds the first objective lens and the second objective lens; a suspension holder that holds the other end of a wire having one end fixed to the lens holder to cantilever the lens holder; and a drive mechanism that drives the lens holder in a focus direction or in a track direction. In the objective lens actuator that holds the lens holder with the wire, in order to enhance the drive sensitivity and the like, the two objective lenses are preferably arranged close to each other. As described above, in the present invention, since the two objective lenses can be arranged close to each other at a low cost, this configuration may be employed as that of the optical pickup.

In the optical pickup configured as described above, the first mirror and the second mirror are preferably formed substantially in the shape of a rectangular parallelepiped. Since the mirrors of this configuration can be manufactured at low cost, they are advantageous in terms of the cost of the optical pickup.

In the optical pickup configured as described above, a direction in which the first emission light enters the first mirror may be opposite to a direction in which the second emission light enters the second mirror.

In the optical pickup configured as described above, the first optical system may be compatible with BDs and the second optical system may be compatible with DVDs and CDs.

According to the present invention, in an optical pickup including two separate optical systems, it is possible to reduce the number of components and its manufacturing cost (cost reduction).

DETAILED DESCRIPTION OF PREFERRED EMBODIMENTS

An embodiment of an optical pickup of the present invention will be described in detail below with reference to the accompanying drawings.

Figure 1A:
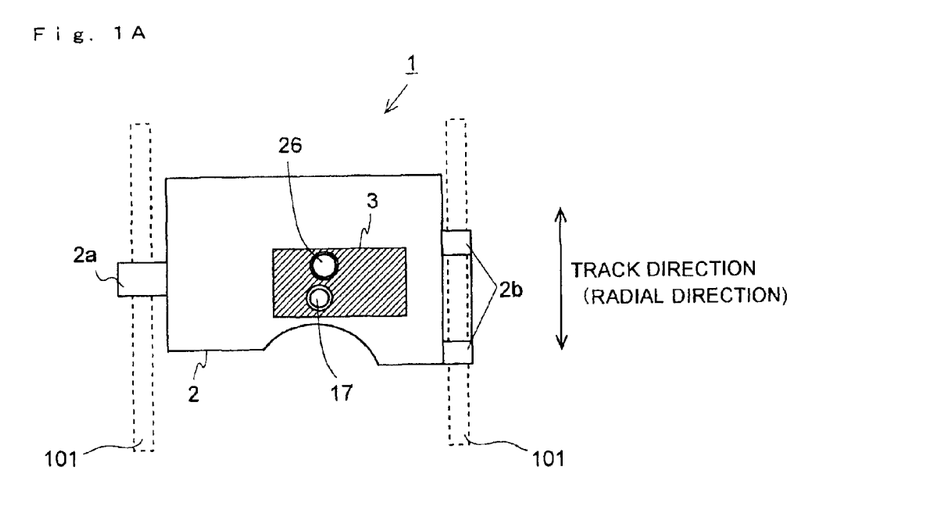
FIG. 1A is a schematic plan view showing the configuration of an optical pickup of this embodiment.
Figure 1B:
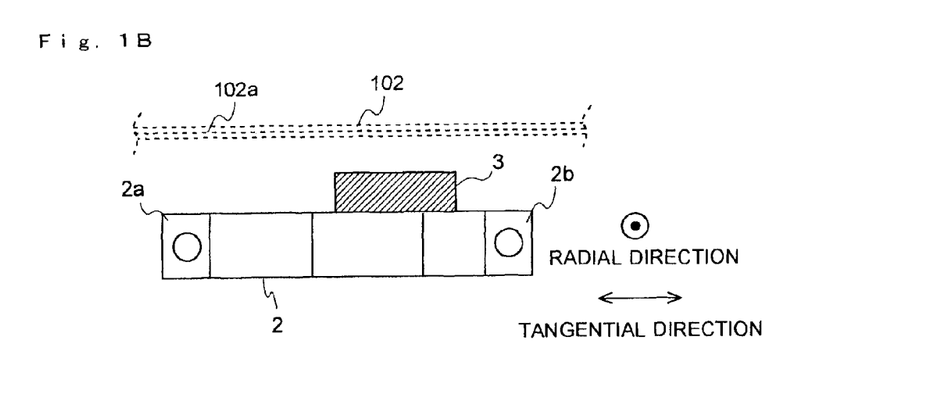
FIG. 1B is a schematic side view showing the configuration of the optical pickup of this embodiment.

FIG. 1A is a schematic plan view showing the configuration of an optical pickup of this embodiment. FIG. 1B is a schematic side view showing the configuration of the optical pickup of this embodiment. As shown in FIGS. 1A and 1B, the optical pickup 1 of this embodiment is provided with a pickup base 2 and an objective lens actuator 3 mounted on the pickup base 2.

When information stored on an optical disc 102 is read, the optical pickup 1 is used by being moved in the radial direction of the optical disc 102. Thus, on the right and left of the pickup base 2 in the optical pickup 1, there are provided bearing portions 2a and 2b; the optical pickup 1 is held such that it can slide on two guide shafts 101 extending in the radial direction.

The optical pickup 1 is moved by an unillustrated known movement mechanism. As an example of the known movement mechanism, there is a movement mechanism that uses a rack that is connected to the pickup base 2 and a pinion that is connected to another base member other than the pickup base and that is rotated by a motor.

Figure 2:
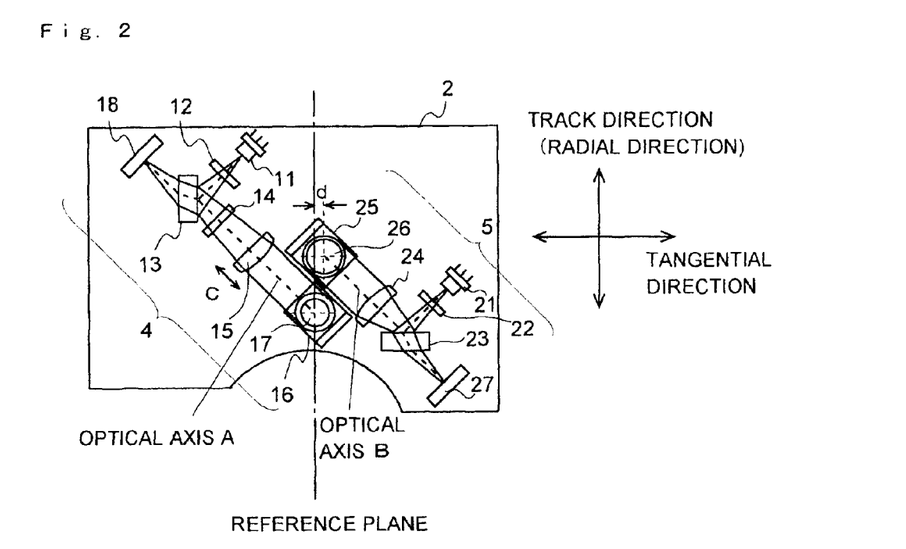
FIG. 2 is a diagram showing the optical configuration of the optical pickup of this embodiment.

FIG. 2 is a diagram showing the optical configuration of the optical pickup of this embodiment. As shown in FIG. 2, the optical pickup 1 of this embodiment has a first optical system 4 and a second optical system 5 that are separate from each other. The first optical system 4 is used to read information stored on a BD. The second optical system 5 is used to read information stored on a DVD or a CD (hereinafter also simply referred to as "DVD/CD").

The first optical system 4 is provided with a first light source 11, a diffraction element 12, a first beam splitter 13, a first quarter wavelength plate 14, a first collimate lens 15, a first upward reflecting mirror 16, a first objective lens 17 and a first receiving element 18. Among these, the members other than the first objective lens 17 are mounted on the pickup base 2. The first objective lens 17 is mounted on the objective lens actuator 3 (see FIGS. 1A and 1B).

The first light source 11 is a semiconductor laser that emits a laser beam (for example, a laser beam with a wavelength band of 405 nm) for use in a BD. The first light source 11 emits linear polarized light. The laser beam (first emission light) emitted from the first light source 11 is separated by the diffraction element 12 into main light and two types of sub light. This is because a track error signal necessary to perform track control is obtained. The optical pickup 1 of this embodiment is formed such that, when the information on the BD is read, a known DPP (differential push-pull) method is used to produce the track error signal. The laser beam emitted from the diffraction element 12 is fed to the first beam splitter 13.

The first beam splitter 13 is formed in the shape of a flat plate; the light receiving surface thereof is arranged at an angle of about 45 degrees with respect to the optical axis of the emission light emitted from the first light source 11. The first beam splitter 13 is a polarization beam splitter, and is formed such that it reflects linear polarized light whose polarization direction coincides with that of the liner polarized light emitted from the first light source 11, and that it transmits linear polarized light whose polarization direction is turned 90 degrees with respect to the linear polarized light emitted from the first light source 11. Thus, the laser beam fed from the diffraction element 12 to the first beam splitter 13 is reflected off the first beam splitter 13. The laser beam reflected off the first beam splitter 13 is fed to the first quarter wavelength plate 14.

The first quarter wavelength plate 14 converts the incoming linear polarized light into circular polarized light, or converts the incoming circular polarized light into linear polarized light. The laser beam fed from the first beam splitter 13 and transmitted through the first quarter wavelength plate 14 is converted into circular polarized light and is fed to the first collimate lens 15.

The first collimate lens 15 can be moved by unillustrated drive means in the direction of the optical axis (in the direction indicated by an arrow C shown in FIG. 2). This is because the position operation changes the convergence and divergence of the laser beam emitted from the first collimate lens 15 to change the convergence and divergence of the laser beam entering the first objective lens 17. This configuration is employed so that spherical aberration can be corrected. The laser beam emitted from the first collimate lens 15 is fed to the first upward reflecting mirror 16.

The first upward reflecting mirror 16 is a mirror member substantially in the shape of a rectangular parallelepiped, and directs the optical axis of the incoming laser beam in a direction (that is, in a direction substantially perpendicular to the plane of FIG. 2) that is substantially perpendicular to the information storage surface 102a (see FIG. 1B) of the optical disc 102. Specifically, the light reflecting surface of the first upward reflecting mirror 16 is inclined about 45 degrees with respect to the optical axis of the laser beam that is emitted from the first light source 11 and that enters the first upward reflecting mirror 16. The laser beam reflected off the first upward reflecting mirror 16 is fed to the first objective lens 17.

The first objective lens 17 is designed for use in the BD, and condenses the laser beam from the first upward reflecting mirror 16 on the information storage surface 102a of the optical disc 102. The laser beam that is condensed by the first objective lens 17 on the information storage surface 102a is reflected off the information storage surface 102a.

The return light (first return light) resulting from reflection off the information storage surface 102a is transmitted through the first objective lens 17 and is reflected off the first upward reflecting mirror 16. Then, the light is passed through the first collimate lens 15, and is thereafter converted by the first quarter wavelength plate 14 into linear polarized light. The polarization direction of this linear polarized light is a direction obtained by turning, 90 degrees, the polarization direction of the linear polarized light emitted from the first light source 11. Thus, the return light passed through the first quarter wavelength plate 14 is transmitted through the first beam splitter 13. In other words, the first beam splitter 13 and the first quarter wavelength plate 14 work together to function as a light isolator.

Incidentally, as described above, the first beam splitter 13 is formed in the shape of a flat plate. Thus, in the return light transmitted through the first beam splitter 13, astigmatism is produced. The return light in which the astigmatism is produced is condensed on the first light receiving element 18. In the optical pickup 1 of this embodiment, the astigmatism produced when the return light is passed through the first beam splitter 13 is utilized, and thus a focus error signal is obtained by an astigmatic method that is a known method. Then, with this focus error signal, focus control is performed.

The second optical system 5 is provided with a second light source 21, a second quarter wavelength plate 22, a second beam splitter 23, a second collimate lens 24, a second upward reflecting mirror 25, a second objective lens 26 and a second light receiving element 27. Among these, the members other than the second objective lens 26 are mounted on the pickup base 2. The second objective lens 26 is mounted on the objective lens actuator 3 (see FIGS. 1A and 1B).

The second light source 21 is a two-wavelength semiconductor laser that can switch between a laser beam (for example, a laser beam with a wavelength band of 650 nm) for use in a DVD and a laser beam (for example, a laser beam with a wavelength band of 780 nm) for use in a CD, and emit it. The second light source 21 emits linear polarized light. The leaser beam (second emission light) emitted from the second light source 21 is fed to the second quarter wavelength plate 22.

The second quarter wavelength plate 22 converts the incoming linear polarized light into circular polarized light. The laser beam emitted from the second light source 21 and transmitted through the second quarter wavelength plate 22 is converted into circular polarized light and is fed to the second beam splitter 23.

The second beam splitter 23 is formed in the shape of a flat plate; the light receiving surface thereof is arranged at an angle of about 45 degrees with respect to the optical axis of the emission light emitted from the second light source 21. The second beam splitter 23 reflects part of the emission light emitted from the second light source 21, and transmits part of the remainder. The laser beam reflected off the second beam splitter 23 is fed to the second collimate lens 24.

The second collimate lens 24 functions as parallel light conversion means for converting the incoming laser beam (diverging light) into parallel light. The leaser beam (parallel light) emitted from the second collimate lens 24 is fed to the second upward reflecting mirror 25.

The second upward reflecting mirror 25 is a mirror member substantially in the shape of a rectangular parallelepiped, and directs the optical axis of the incoming laser beam in a direction (that is, in a direction substantially perpendicular to the plane of FIG. 2) that is substantially perpendicular to the information storage surface 102a of the optical disc 102. Specifically, the light reflecting surface of the second upward reflecting mirror 25 is inclined about 45 degrees with respect to the optical axis of the laser beam that is emitted from the second light source 21 and that enters the second upward reflecting mirror 25. The laser beam reflected off the second upward reflecting mirror 25 is fed to the second objective lens 26.

The second objective lens 26 is designed for the DVD and the CD, and condenses the laser beam from the second upward reflecting mirror 25 on the information storage surface 102a of the optical disc 102. The laser beam condensed by the second objective lens 26 on the information storage surface 102a is reflected off the information storage surface 102a.

The return light (second return light) resulting from reflection off the information storage surface 102a is transmitted through the second objective lens 26, and is reflected off the second upward reflecting mirror 25. Then, the light is passed through the second collimate lens 24, and thereafter enters the second beam splitter 23. The light transmitted through the second beam splitter 23 is condensed by the second light receiving element 27. Incidentally, as described above, the second beam splitter 23 is formed in the shape of a flat plate. Thus, in the return light transmitted through the second beam splitter 23, astigmatism is produced. The return light in which the astigmatism is produced is condensed on the second light receiving element 27.

In the optical pickup 1 of this embodiment, the astigmatism produced when the return light is passed through the second beam splitter 23 is utilized, and thus the focus error signal is obtained by the known astigmatic method. Then, with this focus error signal, the focus control is performed. To perform track control for the DVD/CD, the track error signal is obtained by a DPD (differential phase detection) method that is a known method.

Figure 3:
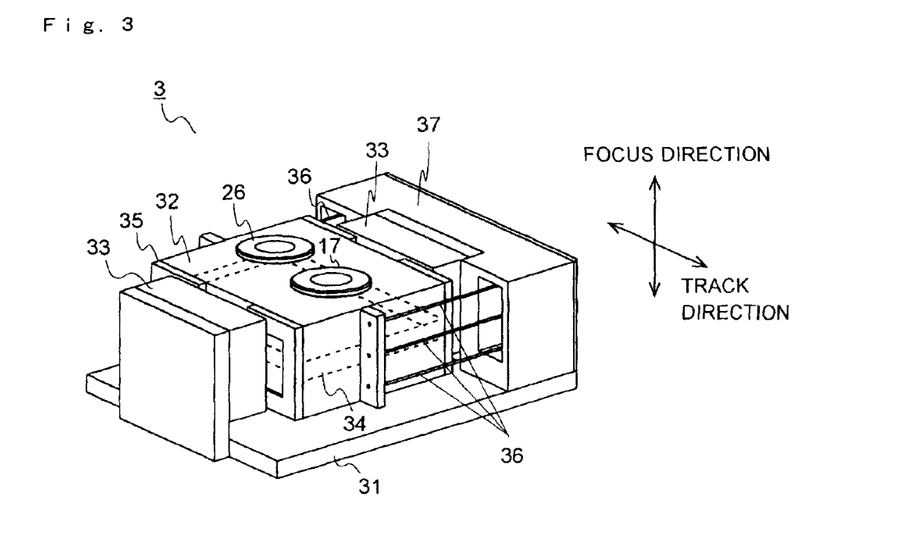
FIG. 3 is a schematic perspective view showing the configuration of an objective lens actuator included in the optical pickup of this embodiment.

As described above, the first objective lens 17 and the second objective lens 26 are mounted on the objective lens actuator 3. The configuration of the objective lens actuator 3 included in the optical pickup 1 of this embodiment will be described with reference to FIG. 3. FIG. 3 is a schematic perspective view showing the configuration of the objective lens actuator included in the optical pickup of this embodiment.

The objective lens actuator 3 is provided with an act base 31 and a lens holder 32 that holds the first objective lens 17 and the second objective lens 26. A pair of permanent magnets 33 are provided to stand on the act base 31 such that they are symmetrically arranged to sandwich the lens holder 32.

In the lens holder 32, there are provided: a focus coil 34 that is wound along the inner side walls of the lens holder 32 substantially in a rectangular shape; and four track coils 35 substantially in a rectangular shape in which two of them are symmetrically arranged on each of the outer side walls (side walls opposite the permanent magnets 33) of the lens holder 32. On each of the two side walls where the track coils 35 are not arranged among the four side walls of the lens holder 32, one ends of three wires 36 are fixed; in other words, one ends of a total of six wires 36 are fixed on the two side walls.

The other ends of the wires 36 are held by a suspension holder 37. Thus, the suspension holder 37 cantilevers the lens holder 32 such that the lens holder 32 is swingable. The wires 36 are also used to feed electric power to the focus coil 34 and the track coils 35.

When current is fed to the focus coil 34, by electromagnetic action produced by the current through the coil and the magnetic field of the permanent magnets 33, the lens holder 32 is moved in a focus direction according to the direction in which the current flows and the magnitude of the current. Likewise, when current is fed to the track coils 35, the lens holder 32 is moved in a track direction according to the direction and magnitude thereof. In other words, the permanent magnets 33, the focus coil 34 and the track coils 35 constitute a drive mechanism for driving the lens holder 32 in the focus direction and in the track direction.

Incidentally, in the optical pickup 1 of this embodiment, as shown in FIG. 2, the optical axis A and the optical axis B are substantially parallel to each other as seen from above, and the optical systems are configured such that the optical axes are each inclined about 45 degrees with respect to the reference plane. The center position of the second objective lens 26 substantially adjacent to the first objective lens 17 in the radial direction is displaced slightly (only a distance "d") from the reference plane in a tangential direction. The reason why this configuration is employed will be described below.

The optical axis A refers to the optical axis of the optical path between the first upward reflecting mirror 16 and the first beam splitter 13. The optical axis B refers to the optical axis of the optical path between the second upward reflecting mirror 25 and the second beam splitter 23. The reference plane refers to a plane that is parallel to the radial direction, that is perpendicular to the pickup base 2 and that passes through the center of the first objective lens 17. The tangential direction refers to the direction of a tangent to the optical disc 102, and the direction is perpendicular to the radial direction.

The reason why the optical axis A is inclined 45 degrees with respect to the reference plane will first be described. As described above, in the optical pickup 1 of this embodiment, when it is designed for the BD, the focus error signal is obtained by the astigmatic method, and the first beam splitter 13 in the shape of a flat plate is used to produce astigmatism.

Figure 4:
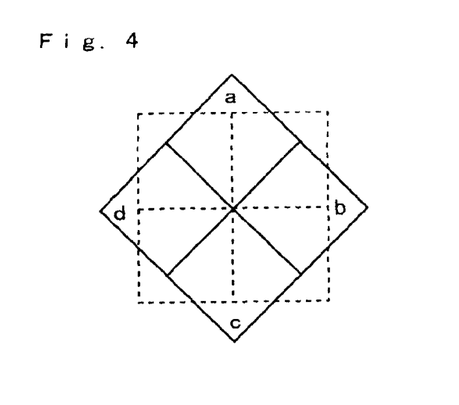
FIG. 4 is a diagram showing the configuration of a first light receiving element included in the optical pickup of this embodiment.

As shown in FIG. 4, the first light receiving element 18 has four light receiving regions "a" to "d" arranged two-by-two, and it is necessary to obliquely arrange on the pickup base 2, as shown in FIG. 4, the four light receiving regions "a" to "d" arranged two-by-two (They are inclined more than zero degrees but less than ninety degrees with respect to the reference state indicated by broken lines.) This is because, unless they are arranged as described above, the focus error signal cannot be obtained by the astigmatic method with the astigmatism produced by the first beam splitter 13 in the shape of a flat plate.

FIG. 4 is a front view of the first light receiving element 18 of FIG. 1 as seen from the side of the light receiving surface. In order to obtain the satisfactory focus error signal, it is preferable to incline the four light receiving regions arranged two-by-two by around 45 degrees. In this embodiment, the four light receiving regions arranged two-by-two are inclined 45 degrees. Here, the "around 45 degrees" refers to a range from 30 degrees to 60 degrees. It is needless to say that, in this embodiment, the second light receiving element 27 has the same four light receiving regions arranged two-by-two, and that they are inclined 45 degrees such that the focus error signal is obtained by the astigmatic method.

On the other hand, as described above, in the optical pickup 1 of this embodiment, when it is designed for the BD, the track error signal is obtained by the DPP method. In this case, one of the lines obtained by projecting two lines dividing the four light receiving regions arranged two-by-two on the information storage surface 102a of the optical disc 102 is needed to be parallel to the tangential direction. Thus, the optical axis A of the first optical system 4 is inclined 45 degrees with respect to the reference plane.

As described above, the four light receiving regions arranged two-by-two are preferably turned such that the focus error signal is obtained by the astigmatic method; they are more preferably turned 30-60 degrees. Thus, the angle by which the four light receiving regions arranged two-by-two is turned is not necessarily 45 degrees. Accordingly, the angle by which the optical axis A is inclined with respect to the reference plane is not limited to 45 degrees; it preferably falls within a range of 30 degrees to 60 degrees.

The reason why the optical axis A and the optical axis B are located substantially parallel to each other and the second objective lens 26 is slightly displaced from the reference plane in the tangential direction will be described.

Figure 5A:
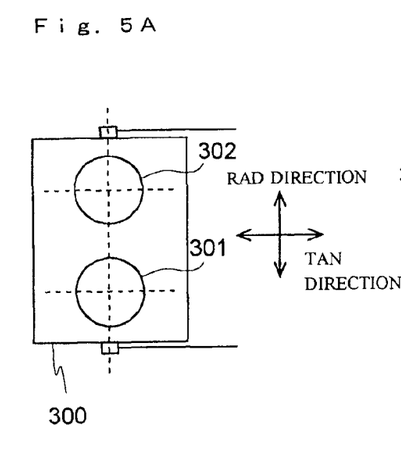
FIG. 5A is diagram showing a first example of mounting two objective lenses on the objective lens actuator.
Figure 5B:
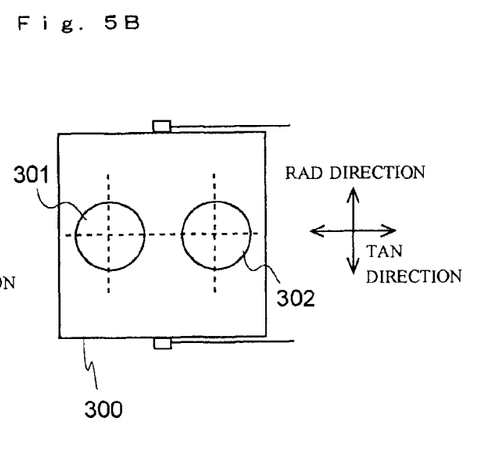
FIG. 5B is diagram showing a second example of mounting the two objective lenses on the objective lens actuator.

FIGS. 5A and 5B are diagrams showing examples of mounting two objective lenses on an objective lens actuator. When the two objective lenses are mounted on the objective lens actuator, the two objective lenses 301 and 302 are generally held by the lens holder 300 either in a fully radial arrangement (see FIG. 5A) or in a fully tangential arrangement (see FIG. 5B). The "fully radial arrangement" refers to an arrangement in which a line intersecting the centers of the two objective lenses 301 and 302 is parallel to the radial (RAD) direction. The "fully tangential arrangement" refers to an arrangement in which the line intersecting the centers of the two objective lenses 301 and 302 is parallel to the tangential (TAN) direction.

In order to obtain sufficient thrust (a force obtained by electromagnetic action of the permanent magnets and the coils) for the lens holder 300, it is necessary to provide a reasonable size of the lens holder 300 in the radial direction. For this reason, as shown in FIGS. 5A and 5B, when the two objective lenses 301 and 302 are placed in the tangential arrangement, the size of the lens holder 300 is increased as compared with the radial arrangement. The larger size of the lens holder 300 disadvantageously increases the size of the optical pick up, the energy for moving the lens holder 300 and the like. Thus, the optical pickup 1 of this embodiment is designed on the precondition (precondition 1) that the tangential arrangement is avoided.

FIGS. 6A to 6D are diagrams showing the reason why, in the optical pickup of this embodiment, the optical axis A and the optical axis B are located substantially parallel to each other and the center position of the second objective lens 26 is slightly displaced from the reference plane in the tangential direction. When the objective lens actuator is configured as in this embodiment, if the two objective lenses 17 and 26 mounted on the lens holder 32 as described above are located far away from each other, properties such as the drive sensitivity and the DC tilt of the objective lens actuator 3 are degraded. Thus, it is necessary to decrease the space between the first objective lens 17 and the second objective lens 26.

In order to decrease the space between the two objective lenses 17 and 26, it is necessary to bring the mirror surface of the first upward reflecting mirror 16 close to the mirror surface of the second upward reflecting mirror 25. If the upward reflecting mirrors are partially cut so that the two mirror surfaces are brought close to each other, this increases the cost of manufacturing the optical pickup. Hence, the partial cutting of the upward reflecting mirrors is needed to be avoided. Thus, the optical pickup 1 of this embodiment is designed on the precondition (precondition 2) that the cutting of the upward reflecting mirrors is avoided because the cutting process increases the cost.

Figure 6A:
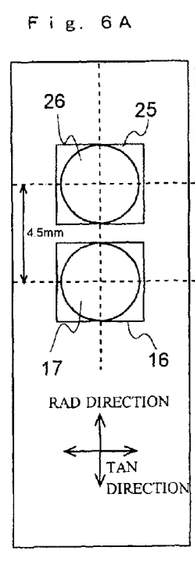
FIG. 6A is a diagram showing the purpose of the optical configuration of the optical pickup of this embodiment.

In view of the preconditions 1 and 2, it can be considered that, as shown in FIG. 6A, the two objective lenses 17 and 26 are placed in the fully radial arrangement, and that the optical axis A of the first optical system 4 and the optical axis B of the second optical system 5 are inclined 90 degrees with respect to the reference plane. However, in the optical pickup 1 of this embodiment, cost reduction is achieved not by using a cylindrical lens for providing astigmatism but by using the first beam splitters 13 and 23 in the shape of a flat plate for producing astigmatism. In this case, since, as describe above, it is necessary to incline the optical axis A of the first optical system 4 by more than zero degrees but less than ninety degrees (preferably, around forty five degrees), it is impossible to employ the configuration of FIG. 6A.

Figure 6B:
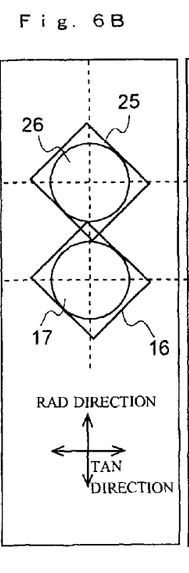
FIG. 6B is another diagram showing the purpose of the optical configuration of the optical pickup of this embodiment.
Figure 6C:
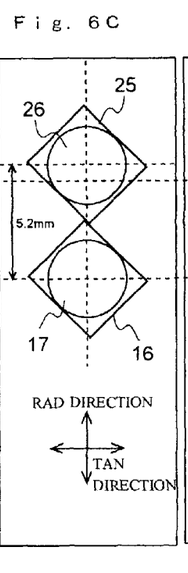
FIG. 6C is another diagram showing the purpose of the optical configuration of the optical pickup of this embodiment.

Thus, it can be considered that, as shown in FIGS. 6B and 6C, the optical axis A and the optical axis B are inclined about 45 degrees with respect to the reference plane, and that the two objective lenses 17 and 26 are placed in the fully radial arrangement. However, in order to achieve the above configuration with the distance (for example, 4.5 mm) between the centers of the two objective lenses 17 and 26 equal to that in FIG. 6A, it is necessary to perform an additional working process for preventing mechanical interference between the upward reflecting mirrors 16 and 25 (see FIG. 6B). This is undesirable for cost reduction. The area of the mirror surface that can be cut is limited so that the effective area of an optical path is acquired, and thus it may be impossible to perform the necessary working process.

On the other hand, in order to avoid the working process to be performed on the upward reflecting mirrors 16 and 25, it is necessary to increase the distance between the centers of the two objective lenses 17 and 26 as shown in FIG. 6C. In this case, the objective lens (in this embodiment, the second objective lens 26) arranged on the side of the outer circumference of the optical disc 102 is insufficiently close to the inner circumference of the optical disc 102, and thus it may be impossible to read information on the side of the inner circumference of the optical disc 102.

Figure 6D:
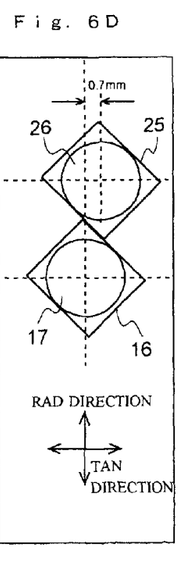
FIG. 6D is another diagram showing the purpose of the optical configuration of the optical pickup of this embodiment.

Thus, in the optical pickup 1 of this embodiment, as shown in FIG. 6D, the optical axis A and the optical axis B are inclined about 45 degrees with respect to the reference plane and are parallel to each other, and the second objective lens 26 is slightly displaced (about 0.7 mm) from the reference plane in the tangential direction. Thus, it is possible not only to decrease the space between the two objective lenses 17 and 26 but also to form the upward reflecting mirrors 16 and 25 into approximate rectangular parallelepipeds to avoid the working process that increases the cost.

In this configuration, since the second objective lens 26 is only slightly displaced from the reference plane, it is largely unnecessary to increase the size of the lens holder 32. Since the second objective lens 26 is slightly displaced in the tangential direction, it is somewhat disadvantageous to use a PP (push-pull) method as a method for obtaining the track error signal. Thus, in this embodiment, the DPD method is used as a method for obtaining the track error signal. However, the method is not limited to the DPD method; the track error signal may be obtained by using a one-beam method such as the PP method.

As described above, with the optical pickup 1 of this embodiment, in order to make it compatible with the BD, the DVD and the CD, it is possible to omit a lens (cylindrical lens) for providing astigmatism in the configuration including the two separate optical systems 4 and 5, and thus it is possible to form the upward reflecting mirrors 16 and 25 into approximate rectangular parallelepipeds. With the upward reflecting mirrors 16 and 25 held substantially in the shape of a rectangular parallelepiped, it is possible to bring the two objective lenses 17 and 26 close to each other, and this makes it possible to stably drive the objective lenses 17 and 26. In other words, the optical pickup 1 of this embodiment can be manufactured at a low cost and has at least performance equivalent to that of the conventional optical pickup.

The present invention is not limited to the embodiment described above. That is, many modifications are possible without departing from the scope of the present invention.

For example, the optical configuration of the optical pickup 1 is not limited to the configuration of this embodiment; many modifications are possible. For example, in the first optical system 4, the first quarter wavelength plate 14 may be omitted, and the first beam splitter 13 does not need to be a polarization beam splitter. In the second optical system 5, the second quarter wavelength plate 22 may be omitted, and the second collimate lens 24 may be omitted as long as the second objective lens 26 is modified to be a finite conjugate type objective lens.

Although, in the embodiment described above, the direction in which the first emission light emitted from the first light source 11 enters the first upward reflecting mirror 16 is opposite to the direction in which the second emission light emitted from the second light source 21 enters the second upward reflecting mirror 25, those directions may be the same direction.

Although, in the embodiment described above, in the objective lens actuator 3, the lens holder 32 is held by the wires, it is needles to say that the configuration of the objective lens actuator 3 is not limited to that of this embodiment. For example, the present invention can be applied to a case where the lens holder holding the objective lenses can slide on a supporting shaft and where an optical pickup includes an objective lens actuator that moves the objective lenses by utilizing such a slidable lens holder.

The present invention is not limited to optical pickups that are used only for reading but can be applied to those that are also used for writing. If the optical pickups are also used for writing, when they are designed for the DVD/CD, it is necessary to obtain the track error signal by a method (such as the PP method) different from the DPD method.

It is needless to say that optical discs on which the optical pickup of the present invention reads and writes information are not limited to the optical discs (the BD, the DVD and the CD) described in this embodiment.

The present invention is suitably applied to optical pickups that are compatible with BDs, DVDs and CDs.

What is claimed is:
1. An optical pickup comprising:
   a first optical system that guides first emission light emitted from a first light source to an information storage surface of an optical disc and that guides, to a first light receiving element, first return light resulting from the first emission light being reflected off the information storage surface; and
   a second optical system that guides second emission light emitted from a second light source to the information storage surface of the optical disc and that guides, to a second light receiving element, second return light resulting from the second emission light being reflected off the information storage surface,
   wherein the first optical system includes: a first mirror that reflects the first emission light to direct an optical axis in a direction substantially perpendicular to the information storage surface; a first objective lens that condenses light reflected off the first mirror on the information storage surface; and a flat-shaped first beam splitter that is arranged in an optical path between the first mirror and the first light receiving element, that reflects the first emission light emitted from the first light source and guides the reflected first emission light to a side of the first mirror and that transmits the first return light resulting from reflection off the first mirror and guides the transmitted first return light to a side of the first light receiving element,
   the second optical system includes: a second mirror that reflects the second emission light to direct an optical axis in a direction substantially perpendicular to the information storage surface; a second objective lens that condenses light reflected off the second mirror on the information storage surface; and a flat-shaped second beam splitter that is arranged in an optical path between the second mirror and the second light receiving element, that reflects the second emission light emitted from the second light source and guides the reflected second emission light to a side of the second mirror and that transmits the second return light resulting from reflection off the second mirror and guides the transmitted second return light to a side of the second light receiving element,
   the first light source, the first mirror, the first beam splitter, the first light receiving element, the second light source, the second mirror, the second beam splitter and the second light receiving element are fixed and arranged on a same base,
   a first optical axis that is the optical axis of an optical path between the first mirror and the first beam splitter is substantially parallel to a second optical axis that is the optical axis of an optical path between the second mirror and the second beam splitter, and
   when a plane that is parallel to a movement direction where the optical pickup is moved with respect to the optical disc at a time of use of the optical pickup, that is perpendicular to the base and that passes through a center of the first objective lens is a reference plane,
      the first optical axis and the second optical axis are inclined more than zero degrees but less than ninety degrees with respect to the reference plane when the base is seen from above,
      the first objective lens and the second objective lens are arranged substantially side-by-side in the movement direction, and
      a center position of the second objective lens is slightly displaced from the reference plane in a direction substantially perpendicular to the reference plane.
2. The optical pickup of claim 1,
   wherein the first light receiving element and the second light receiving element each have four light receiving regions arranged two-by-two, and the first optical axis and the second optical axis are inclined around forty five degrees with respect the reference plane.

3. The optical pickup of claim 2, further comprising:
an objective lens actuator including:
- a lens holder that holds the first objective lens and the second objective lens;
- a suspension holder that holds the other end of a wire having one end fixed to the lens holder to cantilever the lens holder; and
- a drive mechanism that drives the lens holder in a focus direction or in a track direction.

4. The optical pickup of claim 3,
wherein the first mirror and the second mirror are formed substantially in a shape of a rectangular parallelepiped.

5. The optical pickup of claim 4,
wherein a direction in which the first emission light enters the first mirror is opposite to a direction in which the second emission light enters the second mirror.

6. The optical pickup of claim 5,
wherein the first optical system is compatible with BDs and the second optical system is compatible with DVDs and CDs.

7. The optical pickup of claim 1, further comprising:
an objective lens actuator including:
- a lens holder that holds the first objective lens and the second objective lens;
- a suspension holder that holds the other end of a wire having one end fixed to the lens holder to cantilever the lens holder; and
- a drive mechanism that drives the lens holder in a focus direction or in a track direction.

8. The optical pickup of claim 1,
wherein the first mirror and the second mirror are formed substantially in a shape of a rectangular parallelepiped.

9. The optical pickup of claim 1,
wherein a direction in which the first emission light enters the first mirror is opposite to a direction in which the second emission light enters the second mirror.

10. The optical pickup of claim 1,
wherein the first optical system is compatible with BDs and the second optical system is compatible with DVDs and CDs.

* * * * *